United States Patent [19]

Sarugaku et al.

[11] Patent Number: 4,673,983
[45] Date of Patent: Jun. 16, 1987

[54] PICTURE-IN-PICTURE TELEVISION RECEIVERS

[75] Inventors: Toshio Sarugaku, Chiba; Hisafumi Motoe, Kanagawa; Masaharu Tokuhara, Kanagawa; Masayuki Hongu, Kanagawa, all of Japan

[73] Assignee: Sony Corporation, Tokyo, Japan

[21] Appl. No.: 915,397

[22] Filed: Oct. 6, 1986

[30] Foreign Application Priority Data

Oct. 29, 1985 [JP] Japan .............................. 60-242058

[51] Int. Cl.⁴ ...................... H04N 5/272; H04N 5/262
[52] U.S. Cl. ...................................... 358/183; 358/22
[58] Field of Search .......................... 358/183, 22, 182

[56] References Cited

U.S. PATENT DOCUMENTS

| | | | |
|---|---|---|---|
| 3,936,868 | 2/1976 | Thorpe | 358/183 X |
| 4,139,860 | 2/1979 | Micic et al. | 358/22 |
| 4,152,719 | 5/1979 | Kellar | 358/22 |
| 4,249,213 | 2/1981 | Imaide et al. | 358/183 |
| 4,367,484 | 1/1983 | Kuroyanagi et al. | 358/22 |
| 4,623,915 | 11/1986 | Bolger | 358/183 X |

Primary Examiner—Michael A. Masinick
Assistant Examiner—E. Anne Toth
Attorney, Agent, or Firm—Vorys, Sater, Seymour & Pease

[57] ABSTRACT

In a picture-in-picture television receiver, the subpicture signal is A-D converted; the converted digital subpicture signal is latched in response a subpicture clock in synchronism with a subpicture synchronizing signal; the latched signal is latched again and stored in an image memory in response to a main picture synchronizing signal; and the latched signal is read from the image memory in synchronism with the main picture synchronizing signal, in order that the subpicture can stably be inserted in a predetermined area of the main picture by eliminating the unstable data duration during which variation in the subpicture signal is different for each bit signal thereof.

4 Claims, 5 Drawing Figures

PICTURE-IN-PICTURE TELEVISION RECEIVERS

BACKGROUND OF THE INVENTION

1. Field of the Invention

The present invention relates generally to a picture-in-picture television which can reproduce two different pictures simultaneously on a common display screen (such as a cathode ray tube).

2. Description of the Prior Art

Conventionally, picture-in-picture (P in P) television receivers have been well known as shown in FIG. 1, in which a B-channel picture (referred to as subpicture) is displayed being inserted at a predetermined area of an A-channel picture (referred to as main picture) by reducing both the lateral and vertical size of the subpicture to that of ⅓, for instance, of the main picture to reproduce both the main picture and subpicture simultaneously. In these P in P television receivers, if the subpicture is reduced to ⅓, for instance, first the subpicture signals are A-D converted, and then the vertical scanning lines are extracted in a ratio of 1 out of 3 before being written in a picture memory. In this case, the subpicture signals are written in the memory in response to a clock signal synchronized with the synchronizing signal of the subpicture signals, while the subpicture signals are read at a speed three times higher than that in writing the signals in response to a clock signal synchronized with the synchronizing signal of the main picture signal.

In the above-mentioned P in P television receiver, since the sampling frequency on the subpicture side is different from that on the main picture side, it is inevitably necessary to convert the sampling frequency somewhere in the circuit of the P in P television receiver.

In more detail, a subpicture signal is converted from an analog signal to a digital signal, stored in a memory via a write process circuit, read from the memory, and converted from the digital signal to an analog signal. During these operations, the subpicture signal is composed of a plurality of bit signals arranged in series. However, since the time during which variation in signal data becomes stable is different among these bit signals, there exists a problem in that there exists unstable data duration intervals, until the whole bit data become stable.

SUMMARY OF THE INVENTION

With these problems in mind, therefore, it is the primary object of the present invention to provide a picture-in-picture television receiver which can eliminate the afore-mentioned unstable data duration or can stably convert the sampling frequency of the subpicture signal to that of the main picture signal.

To achieve the above-mentioned object, a P in P television receiver for reproducing two different pictures simultaneously on a common display screen, according to the present invention, comprises: (a) analog-to-digital converter means responsive to an analog subpicture signal for outputting a digital subpicture signal; (b) first latch circuit means for latching the digital subpicture signal in response to a subpicture clock signal fw in synchronism with a subpicture synchronizing signal; (c) second latch circuit means for latching an output signal of said first latch circuit means in response to a main picture clock signal $f_R$ in synchronism with a main picture synchronizing signal; (d) memory means for storing an output signal of said second latch circuit means; and (e) read processing circuit means for reading the stored output signal of said second latch circuit means in synchronism with the main picture synchronizing signal to insert the read signal in a predetermined area of the main picture signal.

In the present invention, the sampling frequency of the subpicture signal can stably be converted into that of the main picture frequency by the following steps of: analog-to-digital converting the subpicture signal; latching the converted subpicture signal in response to a subpicture clock in synchronism with the synchronizing signal included in the subpicture signal; latching again and storing the latched subpicture signal in an image memory in response to a main picture clock in synchronism with the synchronizing signal included in the main picture signal; and reading the subpicture signal from the image memory in synchronism with the synchronizing signal included in the main picture signal in order to insert the subpicture in a predetermined area of the main picture.

In the circuit configuration of the present invention, since one latch circuit is synchronized with the subpicture and the other latch circuit is synchronized with the main picture, it is possible to eliminate the fact that the subpicture data signal is latched on the main picture side during the unstable data duration, so that the conversion of the sampling frequency can be effected stably from the subpicture side to the main picture side.

BRIEF DESCRIPTION OF THE DRAWINGS

The features and advantages of the picture-in-picture television receiver according to the present invention will be more clearly appreciated from the following description of the preferred embodiment of the invention taken in conjunction with the accompanying drawings in which.

DETAILED DESCRIPTION OF THE PREFERRED EMBODIMENT

Figure 2:
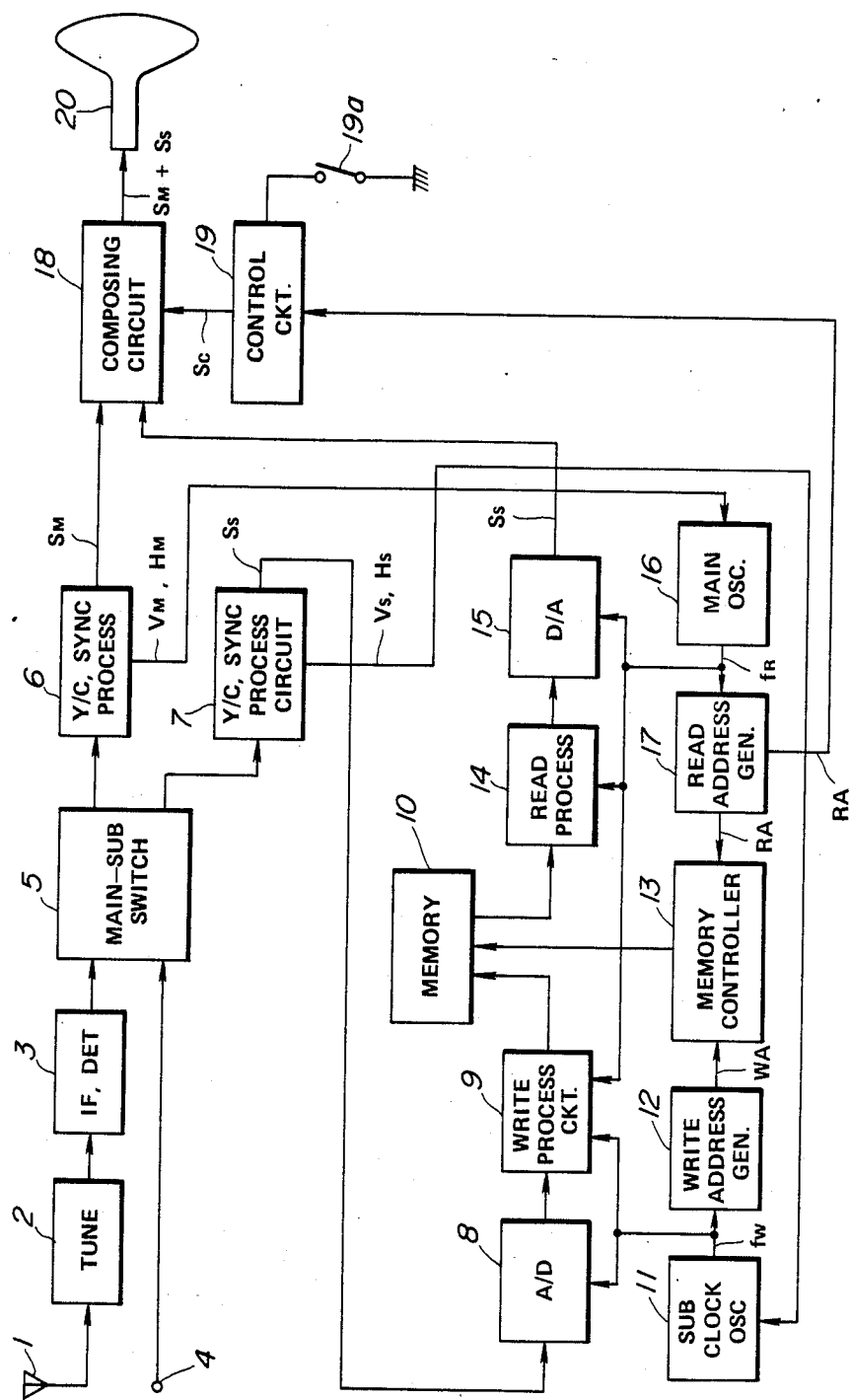
FIG. 2 is a schematic block diagram showing an exemplary circuit of a picture-in-picture television receiver, to which an embodiment of the present invention is applied.

FIG. 2 shows an exemplary circuit of a picture-in-picture television receiver, in which reference numeral 1 denotes an antenna; 2 denotes a tuning circuit; 3 denotes an intermediate frequency amplifier and video detecting circuit; 4 denotes a composite video signal input terminal to which VTR's playback signals are supplied, for instance. The numeral 5 denotes a main-sub switching circuit for selecting one of the video signals from the circuit 3 and the terminal 4 as a main picture and the other as a sub picture. The signals of the main picture obtained by this switching circuit 5 are applied to a Y/C processing and synch. signal processing circuit 6 to obtain a main picture video signal $S_M$, a main picture vertical synchronizing signal $V_M$, and a main picture horizontal synchronizing signal $H_M$. In addition to this, the subpicture signal obtained from the switching circuit 5 is applied to the Y/C processing and synchronization processing circuit 7 to obtain a subpicture video signal $S_S$, a subpicture vertical synchronizing signal $V_S$, and a subpicture horizontal synchronizing signal $H_S$.

The above signal $S_S$ is applied to the A-D converter 8 for conversion thereof into a digital signal. The digital signal is written in a memory 10 through a write processing circuit 9. In this case, when the subpicture is reduced in both the vertical and horizontal size into ⅓ of the main picture, the vertical scanning lines are extracted by the write processing circuit 9 in a ratio of 1 out of 3 and then written in the memory 10. By this, effective picture information made up of 64 scanning lines per one field, for instance is written in the memory 10. Further, in addition to the above-mentioned processing, the write processing circuit 9 converts the sampling frequency in accordance with the present invention as described later with reference to FIG. 3.

A subpicture clock generator 11 generates a clock pulse with a frequency of fw in synchronism with the signals $V_S$ and $H_S$. On the basis of this pulse, a write address generator 12 generates write addresses WA from "0" to "2047". These address signals WA are supplied to a memory 10 via a memory control circuit 13.

Data read from the memory 10 are applied to a D-A converter 15 via a read processing circuit 14 to return the digital signal to the original analog video signal $S_S$.

A main picture clock generator 16 generates a clock pulse of frequency $f_R$ in synchronism with the signals $V_M$ and $H_M$. On the basis of these signals, a read address generator 17 generates read addresses RA from "0" to "2047". These addresses RA are supplied to the memory 10 via the memory control circuit 13. When the subpicture is reduced to ⅓, the above-mentioned reading operation is executed at a speed three times higher than that at writing. That is, information of one scanning line H is speedily read during a period of ⅓H. Further, the above write frequency fw is selected to be 4/3 fsc and the read frequency $f_R$ is selected to be 2 fsc, for instance, where fsc denotes the subcarrier frequency.

In this case the read frequency $f_R$ is selected to be 3/2 times and not three times of the write frequency $f_W$. This is because the A/D converter 8 converts the luminance signal and the color difference signal from the circuit 7 in a time divisional manner as well known in the prior art.

Figure 1:
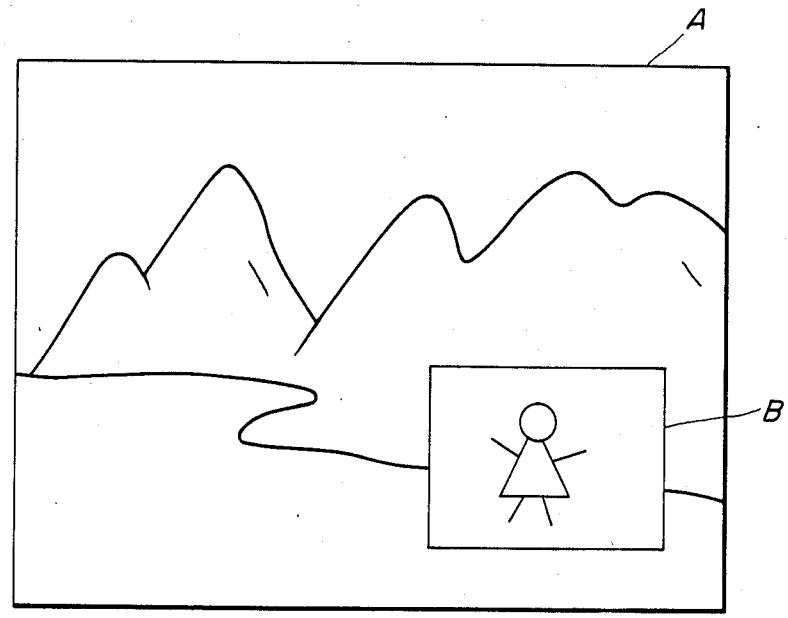
FIG. 1 is an illustration showing a screen of the picture-in-picture television receivers.

The subpicture signal $S_S$ obtained by the D-A converter 15 is applied to a composing circuit 18 together with the main picture signal $S_M$ obtained by the processing circuit 6. This composing circuit 18 is controlled by the switching signal $S_C$ applied from the control circuit 19. Therefore, it is possible to obtain a composite signal $S_M+S_S$ in which the signal $S_S$ is inserted into a predetermined area of the signal $S_M$ through the composing circuit 18, the composite signal being supplied to a picture tube 20. In accordance with the above-mentioned circuit configuration, the subpicture B is reproduced by being reduced to ⅓ both vertically and horizontally at a predetermined area of the main picture A, as shown in FIG. 1, on the picture tube 20.

Further, a switch 19a is provided for the control circuit 19. When this switch 19a is manually turned on, the subpicture B can be erased.

The sampling frequency conversion processing by the write processing circuit 9 according to the present invention will be described with reference to FIGS. 3 and 4.

Figure 3:
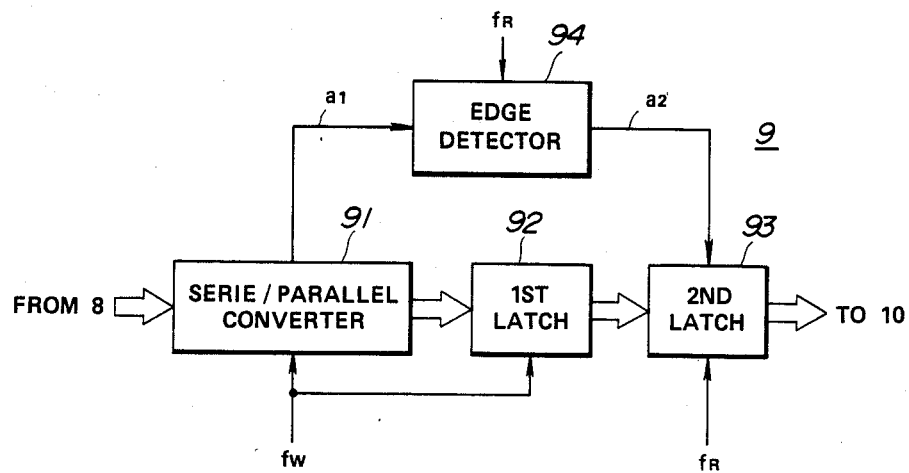
FIG. 3 is a schematic block diagram showing a write process circuit incorporated with the circuit shown in FIG. 1.
Figure 4:
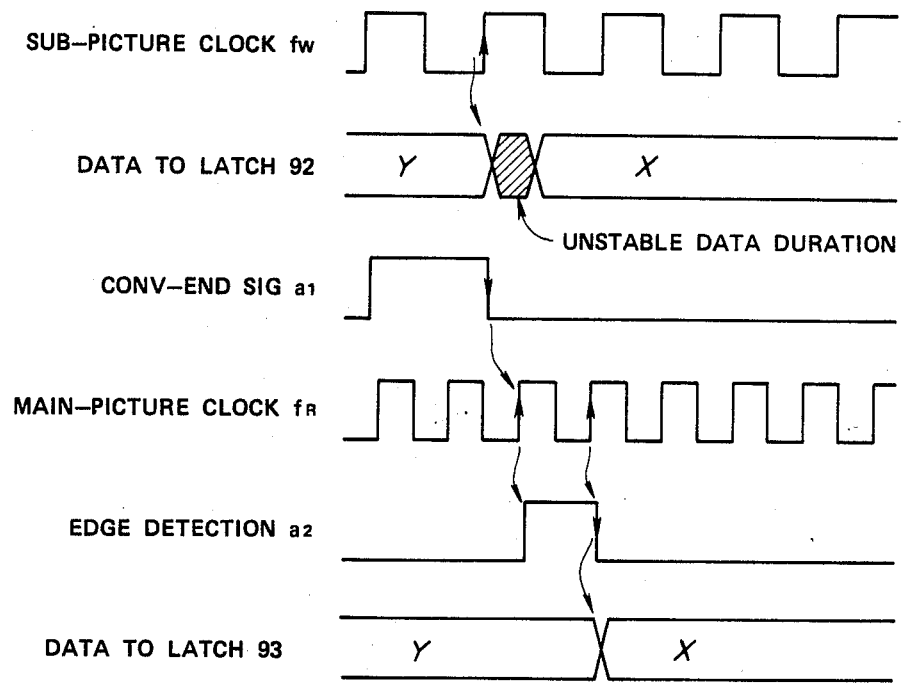
FIG. 4 is a timing chart of the write processing circuit shown in FIG. 2.

In FIG. 3, a 5-bit series data, for instance, is inputted from the A-D converter 8 to a series-parallel converter 91. In this converter 91, for instance, six 5-bit-memory circuits are connected in series. This converter 91 and the succeeding stage 30-bit latch circuit 92 are activated in response to a subpicture clock of frequency fw, and the further succeeding stage latch circuit 93 is activated in response to the main picture clock of frequency $f_R$.

In the operation 30-bit data X, Y are sequentially inputted to the latch circuit 92 in a ratio of one out of six subpicture clocks. In this case, the time during which data become stable without variation is different for each bit of the 30-bit data, so that there occurs a data unstable duration until all the 30-bits become stable.

When the converter 91 performs data series-to-parallel conversion for six 5-bits (total 30 bits), a conversion-end signal $a_1$ is outputted. The trailing edge of this signal $a_1$ is detected by an edge detection circuit 94 as an edge detection signal $a_2$ in synchronism with the main picture clock.

At a time point when one period of the main picture clock has elapsed from the leading edge of this edge detection signal $a_2$, the succeeding stage latch circuit 93 is activated so as to latch the data of the latch circuit 92. Since the above data unstable time is usually shorter than one period of the main picture clock, the latch circuit 93 never fetches the data from the latch circuit 92 within the unstable duration.

Therefore, it is possible to stably convert the data from the sampling frequency of the subpicture to that of the main picture.

This means that the memory 10 can be operated in synchronism with the main picture clock $f_R$ during both the writing and reading periods, so that any data can be handled without the influence of the unstable duration above.

Further, it should be understood that the fetching operation of data from the latch circuit 92 to the latch circuit 93 can be selected at any time point within six periods of the main picture clock. Further, the output of the latch circuit 93 is written in the memory 10 after such a necessary processing that one scanning line is extracted from three scanning lines has been completed.

The method of solving other problems involved in the circuit shown in FIG. 2 will be described.

As described above, where the subpicture is reduced to ⅓, only signals corresponding to one scanning line are used out of the signals corresponding to three scanning lines. In other words, in one field of the subpicture signals, only 3rd, 6th, 9th ... scanning lines are used out of the 1st to nth scanning lines, without use of other scanning lines. Therefore, the roughness of the subpicture inserted in the main picture is conspicuous in the vertical direction.

Figure 5:
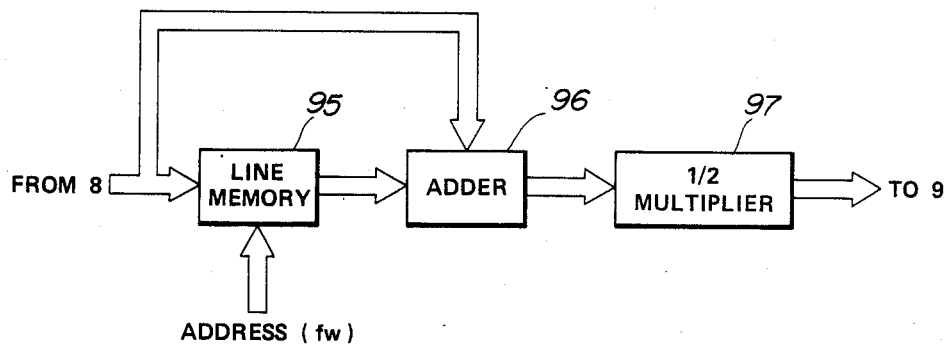
FIG. 5 is a block diagram showing an embodiment of the picture quality improvement circuit connected to the write processing circuit shown in FIG. 3.

FIG. 5 shows an embodiment of a picture quality improvement circuit for solving the above problem. Further, this picture quality improving circuit is connected between the A-D converter 8 and the write processing circuit 9.

In this embodiment, a scanning line is added to a previous scanning line, and the added output is averaged by multiplication of ½. For instance, in one field of the subpicture signal, the 1st scanning line is discarded, the 2nd and 3rd scanning lines are added, and the addition output thereof is divided by 2.

In FIG. 5, when the 2nd scanning line signals are inputted from the previous A-D converter 8 as input data, the data are written in the line memory 95 by setting it write mode. Next, when the third scanning line signals are inputted, data are read from the line memory 95, and the read signals and the 3rd scanning line signals are added by an adder 96. Thereafter, an addition output of this adder 96 is applied to a ½ multiplier 97 for average. Then, the 4th scanning line is discarded, and the same operation is repeated from the 5th scanning line.

As described above, since only the writing and reading operations are alternately performed in the line memory 95, the operation speed of the line memory 95 is sufficient at the frequency fw of the subpicture clock. Therefore, it is possible to use a low-priced low-speed line memory 95.

In spite of the simple circuit configuration, it is possible to eliminate the data unstable duration, and to stably convert the sampling frequency of the subpicture signals to that of the main picture.

What is claimed is:

1. A picture-in-picture television receiver for reproducing two different pictures simultaneously on a common display screen, which comprises:
   (a) analog-to-digital converter means responsive to an analog subpicture signal for outputting a digital subpicture signal;
   (b) first latch circuit means for latching the digital subpicture signal in response to a subpicture clock signal fw in synchronism with a subpicture synchronizing signal;
   (c) second latch circuit means for latching an output signal of said first latch circuit means in response to a main picture clock signal $f_R$ in synchronism with a main picture synchronizing signal;
   (d) memory means for storing an output signal of said second latch circuit means; and
   (e) read processing circuit means for reading the stored output signal of said second latch circuit means in synchronism with the main picture synchronizing signal to insert the read signal in a predetermined area of the main picture signal.

2. A picture-in-picture television receiver as set forth in claim 1, which further comprises:
   (a) series/parallel converter means connected between said analog-to-digital converter means and said first latch circuit for receiving a predetermined number of bit digital subpicture signal in response to the first clock signal in synchronism with a subpicture synchronizing signal, series/parallel converting the bit digital subpicture signal, and outputting a conversion end signal; and
   (b) edge detector means connected between said series/parallel converter means and said second latch circuit means for detecting a trailing edge of the conversion end signal in synchronism with the main picture clock signal and outputting an edge detection signal to fetch data latched by said second latch circuit means by activating said second latch circuit means at a time when predetermined number of periods of the main picture clock has elapsed from a leading edge of the edge detection signal.

3. A picture-in-picture television receiver, as set forth in claim 1, which further comprises picture quality improvement circuit means connected between said analog-to-digital converter means and said series/parallel converter means, said picture quality improvement circuit means comprising:
   (a) line memory means for storing the subpicture signal of predetermined lines in response to the subpicture clock signal;
   (b) adder means for reading a subpicture signal stored in said line memory means and adding the read subpicture signal to a succeeding scanning line subpicture signal; and
   (c) a ½ multiplier means for averaging the added subpicture signal.

4. In a picture-in-picture television receiver for reproducing two different pictures simultaneously on a common display screen, the method which comprises the following steps of:
   (a) analog-to-digital converting a subpicture signal;
   (b) latching the converted signal in response to a subpicture clock in synchronism with a synchronizing signal of the subpicture signal;
   (c) latching again and storing the latched subpicture signal in an image memory in response to a main picture clock in synchronism with a synchronizing signal of a main picture signal; and
   (d) reading the subpicture signal from the image memory in synchronism with the synchronizing signal of the main picture signal before composing a picture-in-picture.

* * * * *